United States Patent [19]

Fluegel

[11] Patent Number: 5,099,877

[45] Date of Patent: Mar. 31, 1992

[54] SWING ELEMENT VALVE

[75] Inventor: Kyle G. Fluegel, Greenville, Tex.

[73] Assignee: E-Systems, Inc., Dallas, Tex.

[21] Appl. No.: 540,175

[22] Filed: Jun. 19, 1990

[51] Int. Cl.⁵ ............................................. F16K 15/03
[52] U.S. Cl. .................... 137/527.8; 137/527
[58] Field of Search .................. 137/527, 527.4, 527.8

[56] References Cited

U.S. PATENT DOCUMENTS

| | | | |
|---|---|---|---|
| 364,206 | 6/1887 | Baltzley | 137/527.8 |
| 385,292 | 6/1888 | Baltzley | 137/527.8 X |
| 474,843 | 5/1892 | Mahan | 137/527.8 X |
| 1,000,719 | 8/1911 | Cram | 137/527.8 |
| 1,653,929 | 12/1927 | Reed | 137/527.8 X |
| 1,926,759 | 9/1933 | Wallman | 137/527.8 X |
| 2,913,001 | 11/1959 | Maslow et al. | 137/527.4 |
| 3,307,576 | 3/1967 | Himes | 137/527.8 |
| 3,921,657 | 11/1975 | Bergmark et al. | 137/527 X |
| 3,937,240 | 2/1976 | Nanny | 137/527.8 |
| 4,034,780 | 7/1977 | Harvath | 137/527.8 |
| 4,095,615 | 6/1978 | Ramsauer | 137/527.8 |
| 4,178,638 | 12/1979 | Meyer | 137/527 X |
| 4,396,034 | 8/1983 | Cherniak | 137/527.8 X |
| 4,407,325 | 10/1983 | Cherniak | 137/527.8 X |

FOREIGN PATENT DOCUMENTS 851293 10/1952 Fed. Rep. of Germany ... 137/527.8
2026137 12/1971 Fed. Rep. of Germany ...... 137/527

Primary Examiner—John Rivell
Attorney, Agent, or Firm—Harold E. Meier

[57] ABSTRACT

A closure element for use in circular ducts for controlling the flow of material in the duct. The element has a unique unitary shape which allows installation within the confines of the duct with minimum distortion of the duct cross-section when the valve is open. This results in a very low pressure drop through the valve. Because the closure element geometry is such that the element pivots from the duct wall solely within the confines of the duct, the valve is well suited as a check valve.

3 Claims, 1 Drawing Sheet

SWING ELEMENT VALVE

TECHNICAL FIELD

The present invention relates to valve elements for use in circular ducts to control the flow of material. Specifically, the valve element has a configuration that allows it to operate within the confines of the duct without distortion of the duct cross-section when the valve is fully opened.

BACKGROUND OF THE INVENTION

Check valves are well known in the art and have been built for centuries. In mechanical engineering practice, a check valve takes several forms. "Lift" or "poppet" check valves are characterized by containing a valve element that is located in the flow stream. In this type of valve, the force of the flow stream moves the valve element into an enlarged section of the flow duct so that the flow stream passes around the element with a minimum of turbulence. "Swing" check valves contain a valve element that is hinged to swing in the preferred direction of flow. Prior art valve elements having a generally flat configuration resulted in the requirement to change the cross-section of the flow duct for a considerable distant upstream and downstream from the valve location to minimize flow turbulence. These types of check valves are used extensively in process industries. In aircraft, the most commonly used check valve is the "flapper" check valve in which two semi-circular valve elements swing from a support in the center of the valve. These valves are commonly used in aircraft as they are more compact and are of lighter weight than any of the previously mentioned types.

The primary disadvantage of the prior art check valves is that significant pressure drops occur as a result of the protuberances, which are part of these valves, projecting the duct. Prior art "lift" and "flapper" check valves contain structure which protrudes into the highest velocity section of the flow. The prior art "swing" check valve requires that the duct cross-section be modified. In addition to pressure drop, these difficulties result in noise, weight, expended energy and the requirement of additional installation length in the duct.

The present invention, because of the shape of the closure element and because it swings to a position that maintains the circular cross-section of the duct when in the open position, results in a minimum pressure drop and minimizes the associated problems of noise and energy loss. Because the valve operates solely within the confines of the duct, the problems associated with the valve installation length are mitigated.

In order to maintain the circular cross-section of the duct, the present invention includes an elongated closure element formed in the shape of the circular wall of the duct. The closure element is hingedly connected to the duct wall at a point on an end edge of the element. When the valve is open, the circular cross-section of the inside diameter of the duct is maintained. The entire closure element operates solely within the confines of the duct to check the flow of material.

The geometry of the closure element of the valve is best understood by considering the surface formed by intersecting two cylinders within the inside radius of the duct. The angle of the wall of the closure element in the closed position with respect to the primary duct is the angle between two cylinders whose center lines intersect at an angle Θ. Modifications are made to the geometry to prevent the lower corners of the closure element from intersecting the duct wall during rotation. In theory, this curved surface results in small sectors of open area between the closure element and the duct wall on each side of the closure element when the valve is in the closed position. In practice, this area is small and in many instances may be ignored. It may be minimized by adding small flats to the duct on each side. As these flats are at the duct wall where the velocity is lowest and the effect on pressure drop is negligible.

The surface at the outer edge of the closure element will be defined by a curve which is generated by sweeping the curves that limit the surface at the inside radius of the duct about the hinge point.

SUMMARY OF THE INVENTION

The present invention relates to a check valve for use in a circular duct to control the flow of material within the duct. It comprises a closure element shaped to conform to the circular wall of the duct and a hinge connecting the closure element at one end to the circular duct wall such that the element operates solely within the confines of the duct between a closed and an open position.

BRIEF DESCRIPTION OF THE DRAWINGS

A more complete understanding of the invention may be had by reference to the following Detailed Description when taken in conjunction with the accompanying drawings in which.

DETAILED DESCRIPTION OF THE DRAWINGS

Figure 1B:
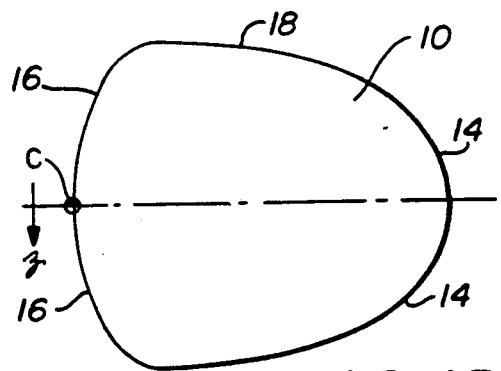
FIG. 1B is a top view of the closure element of the present invention.
Figure 1C:
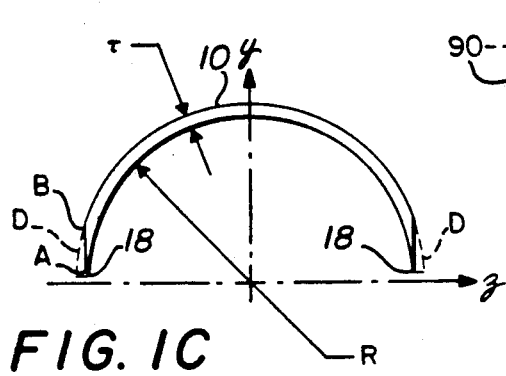
FIG. 1C is an end view of the closure element.
Figure 1A:
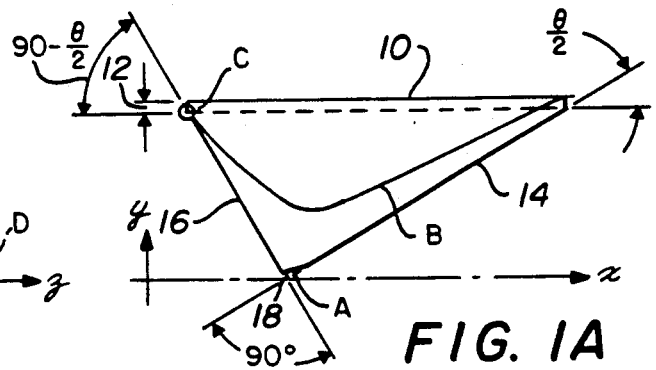
FIG. 1A is a side view of the closure element.

The geometry of the closure element in the valve is best understood by considering the element geometry illustrated in FIGS. 1A, 1B and 1C. These FIGURES show how the curves of the closure element geometry may be defined using intersecting cylinders. The angle Θ through which the closure element 10 moves from open to closed is equal to the angle between the centerlines of two intersecting cylinders which define the major curves in the closure element 10. The curves 14 and 16 which are formed when these cylinders intersect are seen as lines 14 and 16 in a side view such as FIG. 1A.

As shown in FIG. 1B, the edge lines 14 and 16 of closure element 10 are at the angles Θ/2 and 90°−Θ/2 respectively with reference to the closure element 10. Edge A is formed at the intersection of lines 14 and 16 to prevent the lower corners 18 of the closure element 10 from interfering with the inside radius of duct wall 12 during rotation. In theory, edge A results in small sectors of open area between the closure element 10 and the inside radius of duct 12 on each side of the element 10 when the valve is closed. In practice, this area is small and in many instances may be ignored. To minimize the open area resulting from the edge A, small flats 20 (shown in FIG. 3B) are attached to each side of the interior wall of the duct wall 12. As these flats 20 are at the sides of duct wall 12 where the velocity is lowest and the effect on pressure drop is negligible.

The surface at the outer edge of the closure element 10 will be limited by edge B. Curve B is generated by sweeping lines 14, 16 and 18 about the hinge point. This curve is closely approximated by projecting the lines 14, 16 and 18 (which lie on the inner surface of the closure element) in the y direction. Curve B is a consequence of the thickness of the closure element. If the closure element were extremely thin, Curve B would be indistinguishable from lines 14, 16 and 18. To create Curve B in a manufacturing environment it is possible to cut the closure element from a section of straight tube by cutting lines 14, 16 and 18 in the z direction. Curve B is then formed by grinding away the sections marked D in FIG. 1C projecting lines 14, 16 and 18 from the inner radius of the closure element to the outer radius of the closure element in the y direction.

Figure 2:
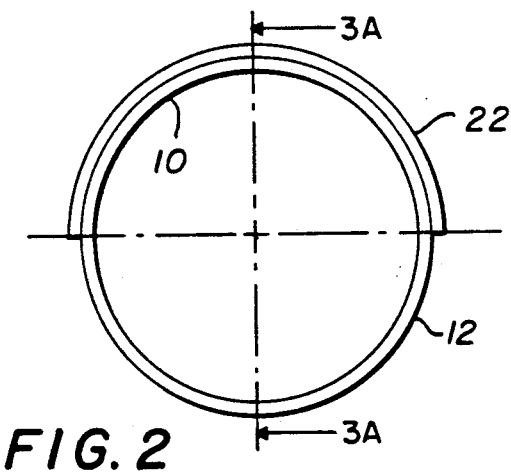
FIG. 2 is a cross-sectional view of the circular duct in which the valve element is mounted illustrating the cover plate fastened to the duct wall over the closure element.

FIG. 2 is a cross-section of an end view of the duct 12 illustrating a cover plate 22 attached to the duct over the area where the closure element 10 is mounted to the duct 12. This Figure also shows the position of the closure element 10 in the recessed position allowing a flow through the duct 12 with a minimum of turbulence.

Figure 3A:
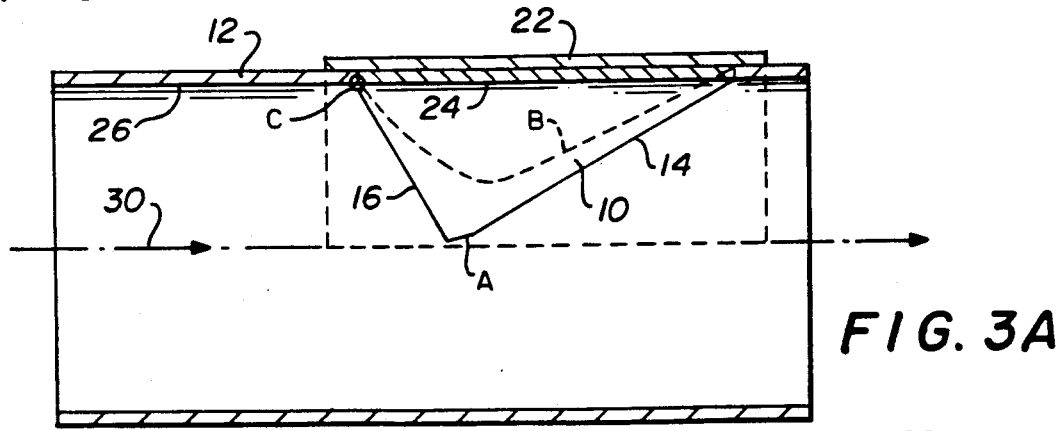
FIG. 3A is a cross-sectional view of FIG. 2 illustrating the closure element in the open position.

FIG. 3A is a cross-section view taken along lines 3A—3A of FIG. 2 and illustrates the closure element 10 in its open position and which, because of its shape, and manner of hinged attachment at hinge C to the duct 12, maintains the circular cross-section of the duct 12. The result is a minimum of pressure drop and associated problems of noise and energy loss.

Figure 3B:
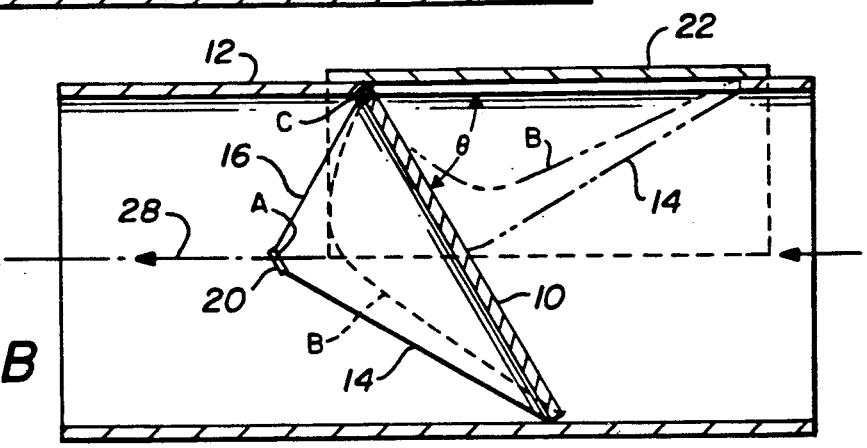
FIG. 3B is a cross-sectional view similar to that illustrated in FIG. 3A except illustrating the closure element in the closed position.

As shown in FIG. 3A and FIG. 3B, the valve operates solely within the confines of the duct 12 and thus the problems associated with the valve installation length are mitigated. As can been seen in FIG. 3A, the inner surface 24 of the closure element 10 is in alignment with the inner surface 26 of the duct 12 thus forming a substantially straight wall with a minimum of impediments to the flow within the duct 12. The cover plate 22 is attached to the duct over the area in which the closure element 10 is mounted to create an airtight or liquid tight seal with the outer wall of duct 12.

FIG. 3B is a cross-sectional view of the duct 12 with the closure element 10 in the closed position. Edge A rests against flat 20 to form a tight seal with the side wall of duct 12 and the plate 22 forms a seal over the opening in duct 12 where the element 10 is positioned when the valve is opened. Thus, there will be no flow through the duct 12 when element 10 is in the closed position, and there is an unimpeded flow in the direction of arrow 30 as shown in FIG. 3A when the valve is in the open position.

In addition to its use as the functional element in a check valve, the closure element 10 may be used as the functional element in shut-off valves or control valves in which the full free flow area must be maintained in a space efficient manner. The closure element 10 may be useful in handling some of the low pressure non-Newtonian fluids encountered in the food processing industry where the problems associated with irregularities in the cross-section of a valve cause clogging. Because the sealing surfaces of the valves slope away from the direction of flow, these surfaces are self-cleaning and make the valve element suitable for use in waste water systems. The valve element may be cut from any section of a straight duct, and is also useful in stopping the flow from ruptured or runaway fluid systems where a shut-off valve has not been previously installed. This may be accomplished by locating a section of straight duct in the runaway system, mounting a hinge, and cutting the closure element in situ. The closure element is then used to stop the flow using an actuator, jack or other means.

The closure element may be used in other applications as a control or shut-off valve by adding an operating mechanism, well-known in the art, to force the closure element into a closed position.

Only preferred embodiments of the invention have been described. It should be understood that the invention is not limited to the embodiments disclosed, but is intended to embrace any alternatives, modifications, rearrangements, or substitutions of parts or elements as fall within the spirit and scope of the invention.

I claim:

1. A valve adapted to prevent reverse flow of material in a cylindrical duct having an inside and outside diameter, said valve comprising:

a closure element having a predetermined swing angle of Θ degrees between an open and closed position, said swing angle being less than 90°, said closure element having a surface bounded by a curvilinear first edge substantially corresponding to a first cylinder, having the same outside diameter as the inside diameter of said cylindrical duct, intersected by a curvilinear second edge substantially corresponding to a second cylinder of equal diameter of the first cylinder, the angle formed by the intersection of the centerlines of said first and second cylinders being equal to Θ degrees, said surface area being bounded by the second edge comprising a generally semicircular edge, tapered side edges and a curved first edge;

said closure element being formed from a blank cut from a cylinder generally corresponding to said cylindrical duct with the curvilinear geometry of said closure element formed by removing those portions of said blank extending beyond parallel planes perpendicular to an inside diameter of said blank defined by a line connecting the intersections of said second edge and opposed side edges;

a closure element receiving aperture, said aperture being formed in said cylindrical duct to generally correspond to the curvilinear geometry of said closure element and being adapted to receive said closure element;

a hinge pivotally connecting said cylinder duct to said second edge of said closure element to provide said duct when the closure element is in an open position with a substantially unconstricted circular cross-section bounded by the inside diameter of said cylindrical duct, said hinge pivotally connecting said duct to said second edge of said closure element such that with said closure element in a closed position the element substantially blocks reverse flow of material through the duct, said closure element intersecting the central longitudinal axis of said duct at said predetermined angle Θ in the closed position;

a pair of stationary closure flats located on opposing sides of said cylindrical duct and adapted to cooperate with said closure element to substantially complete closure of said duct when said closure element is in the closed position.

2. The valve of claim 1 further comprising a generally semi-cylindrical cover plate adapted for mounting on the outside of said cylindrical duct over said closure element receiving aperture to prevent the flow of material from said aperture when said closure element is the closed position.

3. The valve of claim 1 further comprising an actuator for selectively positioning said closure element.

* * * * *